(12) United States Patent
Cherubini et al.

(10) Patent No.: US 9,443,539 B2
(45) Date of Patent: Sep. 13, 2016

(54) WRITE HEAD FOR A MAGNETIC TAPE MEDIUM WITH MAGNETICALLY ENCODED SERVO BAND BURSTS

(71) Applicant: International Business Machines Corporation, Armonk, NY (US)

(72) Inventors: Giovanni Cherubini, Rueschlikon (CH); Johan B. C. Engelen, Rueschlikon (CH); Simeon Furrer, Reuschlikon (CH); Mark A. Lantz, Rueschlikon (CH)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/791,659

(22) Filed: Jul. 6, 2015

(65) Prior Publication Data

US 2015/0356993 A1    Dec. 10, 2015

Related U.S. Application Data

(62) Division of application No. 13/915,885, filed on Jun. 12, 2013, now Pat. No. 9,123,354.

(30) Foreign Application Priority Data

Jun. 28, 2012   (GB) .................................. 1211473.2

(51) Int. Cl.
*G11B 5/265*   (2006.01)
*G11B 5/17*    (2006.01)
*G11B 15/087*  (2006.01)
(Continued)

(52) U.S. Cl.
CPC ....... *G11B 5/00817* (2013.01); *G11B 5/00813* (2013.01); *G11B 5/00826* (2013.01); *G11B 5/17* (2013.01); *G11B 5/265* (2013.01); *G11B 5/584* (2013.01); *G11B 5/5928* (2013.01);
(Continued)

(58) Field of Classification Search
None
See application file for complete search history.

(56) References Cited

U.S. PATENT DOCUMENTS 4,488,188 A    12/1984  Hansen et al.
4,825,318 A *   4/1989  Hoo ......................... G11B 5/58
                                                    360/121
(Continued)

OTHER PUBLICATIONS

M. Eisenberg, et al. "Tape Heads for High Track Density Linear Recording," BP15, Magnetics Conference, 2002. INTERMAG Europe 2002. Digest of Technical Papers. 2002 IEEE International, May 2002, 1 page.

(Continued)

*Primary Examiner* — Craig A. Renner
(74) *Attorney, Agent, or Firm* — Cantor Colburn LLP

(57) ABSTRACT

A write head for writing a servo pattern to a magnetic tape medium includes a first coil configured to generate a first magnetic flux when applying an electric current to the first coil, a second coil configured to generate a second magnetic flux when applying an electric current to the second coil, and a pole piece structure configured to guide the generated magnetic flux. The pole piece includes a first ring structure for guiding the first magnetic flux, a second ring structure for guiding the second magnetic flux, and a common section of the first and the second ring structure which common section is arranged between the first coil and the second coil. The write head further includes a section containing a gap in each of the first ring structure and the second ring structure. The magnetic flux is oriented in opposite directions across the two gaps.

8 Claims, 4 Drawing Sheets

(51) Int. Cl.
*G11B 5/584* (2006.01)
*G11B 5/78* (2006.01)
*G11B 5/008* (2006.01)
*G11B 20/12* (2006.01)
*G11B 5/592* (2006.01)

(52) U.S. Cl.
CPC ......... *G11B15/087* (2013.01); *G11B 20/1201* (2013.01); *G11B 2220/956* (2013.01)

(56) References Cited

U.S. PATENT DOCUMENTS

| | | | |
|---|---|---|---|
| 6,031,673 | A | 2/2000 | Fasen et al. |
| 6,111,719 | A | 8/2000 | Fasen |
| 6,580,581 | B1 | 6/2003 | Bui et al. |
| 7,072,133 | B1 * | 7/2006 | Yip ................. G11B 5/584 360/121 |
| 7,130,140 | B1 | 10/2006 | Boyer et al. |
| 7,170,702 | B2 | 1/2007 | Ohtsu |
| 7,511,908 | B2 | 3/2009 | Winarski et al. |
| 2003/0095353 | A1 | 5/2003 | Nakao |
| 2004/0174132 | A1 | 9/2004 | Johnson et al. |
| 2005/0122615 | A1 | 6/2005 | Horimai |
| 2005/0219734 | A1 * | 10/2005 | Rothermel ............. G11B 5/584 360/75 |
| 2005/0231845 | A1 | 10/2005 | Shirouzu |
| 2007/0115576 | A1 | 5/2007 | Winarski et al. |
| 2007/0115577 | A1 | 5/2007 | Winarski et al. |
| 2009/0316291 | A1 * | 12/2009 | Biskeborn .......... G11B 5/00826 360/121 |
| 2012/0014010 | A1 | 1/2012 | Cherubini et al. |
| 2012/0019948 | A1 | 1/2012 | Fasen |
| 2012/0019954 | A1 | 1/2012 | Imaino et al. |
| 2012/0194941 | A1 | 8/2012 | Jubert |

OTHER PUBLICATIONS

Randy Glissmann, "Using Track-Following Servo Technology on LTO Tape Drives," IEEE Symposium on Mass Storage Systems, 2000, pp. 259-263.

UK Intellectual Property Office; Application No. GB1211473.2; Patents Act 1977: Search Report Under Section 17(5); Date Mailed; Oct. 25, 2012; pp. 1-4.

* cited by examiner

WRITE HEAD FOR A MAGNETIC TAPE MEDIUM WITH MAGNETICALLY ENCODED SERVO BAND BURSTS

DOMESTIC AND FOREIGN PRIORITY

This application is a divisional application of U.S. application Ser. No. 13/915,885, filed Jun. 12, 2013, which claims priority to Great Britain Patent Application No. 1211473.2, filed Jun. 28, 2012, and all the benefits accruing therefrom under 35 U.S.C. §119, the contents of which in its entirety are herein incorporated by reference.

BACKGROUND

The present invention relates to a magnetic tape medium for storing data, to write heads for writing a servo pattern to a magnetic tape medium, and to methods for writing a servo pattern to a magnetic tape medium.

Magnetic tape storage media typically comprise servo information prerecorded in one or more of dedicated servo bands that extend next to data tracks for storing data, which servo bands extend in a longitudinal direction along the tape medium. A servo band typically is read by a dedicated servo reader of a tape head of a tape drive, into which a cartridge containing the tape medium is inserted to. The read servo information allows for determining a lateral deviation of the tape medium from a lateral reference position, which lateral reference position is desired for correctly reading data from and writing data to the tape medium by dedicated read and write elements of the tape head. A position error signal supplied by the servo reader may be translated into a control signal for an actuator for controlling the lateral position of the tape head with respect to the tape medium.

Timing-based servo (TBS) is a technology developed specifically for linear tape drives in the late '90s. In TBS systems, recorded servo patterns comprise transitions with at least two different azimuthal slopes. The tape head lateral position is derived from the relative timing of pulses generated by a servo reader reading the servo pattern. TBS was adopted by the linear tape open (LTO) consortium, and a complete format for LTO tape drives of the first generation was standardized by the European Computer Manufacturers Association (ECMA) in 2001 as ECMA-319. The servo patterns in LTO are written on five dedicated servo bands that straddle four data bands.

SUMMARY

In one embodiment, a magnetic tape medium includes at least one servo band along a longitudinal extension of the tape medium, the at least one servo band comprising servo patterns organized in servo frames for supporting to determine positional information; at least one of the servo frames comprising a first burst comprising at least two servo stripes inclined at a first angle with respect to a direction orthogonal to the longitudinal extension of the tape medium, followed by a second burst comprising at least two servo stripes inclined at a second angle with respect to the direction orthogonal to the longitudinal extension of the tape medium, which second angle is different from the first angle; and wherein at least one of the stripes of the first burst has a first magnetic polarity, and wherein at least one of the stripes of the second burst has a second magnetic polarity different from the first magnetic polarity.

BRIEF DESCRIPTION OF THE SEVERAL VIEWS OF THE DRAWINGS

The invention and its embodiments will be more fully appreciated by reference to the following detailed description of illustrative embodiments in accordance with the present invention when taken in conjunction with the accompanying drawings.

DETAILED DESCRIPTION

Figure 1:
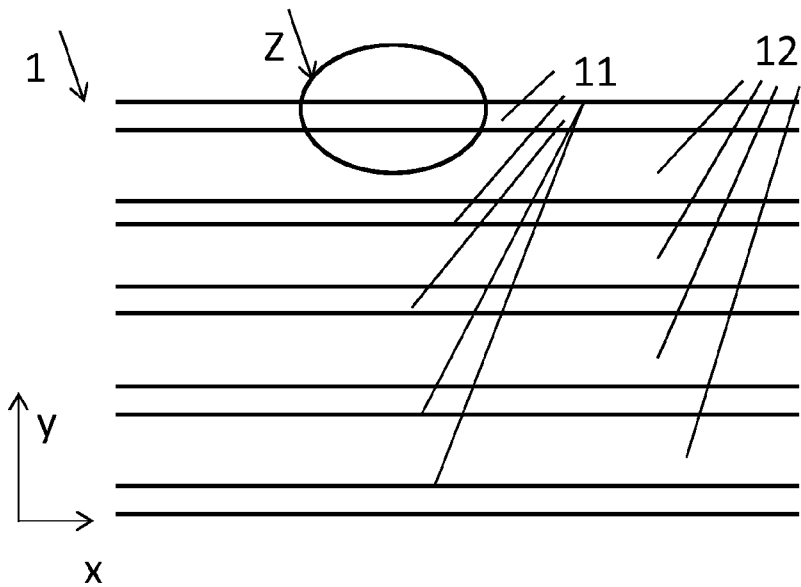
FIG. 1 a schematic top view on a section of a tape medium according to an embodiment of the present invention, FIG. 2 a cutout in area Z of the tape medium of FIG. 1, according to an embodiment of the present invention, FIGS. 3 to 7 each a top view on a geometry of a servo pattern of a tape medium, according to an embodiment of the present invention, FIG. 8 a first embodiment of a write head in a top view, according to an embodiment of the present invention, FIG. 9 a second embodiment of a write head in a top view in diagram A), and in a side cut in diagram B), according to an embodiment of the present invention.

The embodiments herein are generally directed to a magnetic tape medium for storing data. Such magnetic tape medium (also abbreviated as tape) may be arranged in a cartridge which cartridge may be inserted into a tape drive for reading data from the magnetic tape medium and writing data to the magnetic tape medium. The magnetic tape medium has a longitudinal extension and a width orthogonal to its longitudinal extension. The magnetic tape is wound on one or more reels which are driven by the tape drive in order to make the magnetic tape medium pass by a tape head for reading and/or writing data from and/or to the magnetic tape medium. The magnetic tape medium typically is preformatted with servo information. This servo information in form of servo patterns enables the tape head to pick up information as to a lateral position of the tape head with respect to the magnetic tape medium, which lateral position is a position orthogonal to the longitudinal extension of the magnetic tape medium. Such position information may be converted into a control signal for the tape head to laterally readjust the tape head in case a deviation from a lateral reference position is detected which lateral reference position is desired to be maintained by the tape head for correctly reading data from and writing data to the tape by dedicated read and write elements of the tape head. The deviation signal, also denoted as position error signal (PES), is typically supplied by a servo channel processing the signal from a dedicated servo reader of the tape head and may be translated into a control signal for an actuator for controlling the lateral position of the tape head with respect to the tape. Given that in one embodiment the servo reader and any other read and/or write element of the tape head are commonly actuated by the actuator, a rapid correction of the tape head deviation may be achieved during reading and/or writing data from and/or to the tape.

The servo information typically is preformatted on dedicated areas of the tape, also denoted as servo bands extending along the longitudinal extension of the tape. The servo information typically is prerecorded in the one or more servo bands by the tape manufacturer. The one or more servo bands extend next to data bands for storing data. Each data band may contain multiple data tracks, wherein each data track is provided for sequentially storing data.

In the servo band, the servo information represented by servo patterns is organized in multiple servo frames with each servo frame containing a servo pattern. A servo frame may, for example, be considered as a unit containing servo information according to a specific arrangement. In the present embodiment, a servo frame, and preferably each servo frame of the servo band may contain multiple bursts. Each burst preferably includes a sub-pattern which in the present embodiment is defined by an orientation of multiple stripes arranged in parallel to each other. Preferably each stripe extends throughout a width of the servo band and in addition shows an asymmetry both with respect to a longitudinal centerline of the servo band and orthogonal to its longitudinal extension such that for any position of the servo reader offset from its lateral reference position pulses in the servo read back signal show up at different times with respect to pulses that originate from a servo reader being positioned in its reference position, e.g., on the centerline.

In an exemplary embodiment, each servo frame contains at least two bursts wherein each burst contains a servo sub-pattern of a set of parallel stripes of magnetic transitions. Hence, a burst may be interpreted as a set of stripes parallel to each other. In a first one of the at least two bursts the at least two servo stripes are inclined at a first angle with respect to a direction orthogonal to the longitudinal extension of the tape medium, which angle is also referred to as azimuthal angle. The first burst is followed by a second burst in which second burst the at least two servo stripes are inclined at a second angle with respect to a direction orthogonal to the longitudinal extension of the tape, which second angle is different from the first angle. This means, that the stripes of neighboring bursts are not parallel to each other. In an exemplary embodiment, the first angle is $+\alpha$ while the second angle is $\beta=-\alpha$ with respect to the lateral axis. In such arrangement of stripes within consecutive bursts, an interval between pulses generated by the servo reader when scanning the first and the second burst indicates a lateral position of the servo reader, and as such a deviation of the servo reader from its reference position, and as such a deviation of the position of the tape head relative to the tape media. For example, in case the lateral reference position is in the middle of the servo band and the servo head is offset from such middle position, a distance between a stripe of the first burst to a stripe of the second burst in a lateral offset situation is different than a corresponding distance when the servo reader matches the reference position in the middle of the servo band due to the stripes inclined at different angles in the two bursts. A different distance is reflected in a varied timing of pulses supplied by the servo reader when scanning across the first and second servo burst. Hence, a timing based evaluation of the position error signal supplied in form of pulses by the servo reader is performed.

In another embodiment, a servo frame includes four servo bursts wherein the first and the third servo bursts comprise stripes parallel to each other, and wherein the second and the fourth servo bursts comprise stripes parallel to each other. However, the stripes of neighboring servo bursts are not parallel to each other. In such configuration, two neighboring groups of two bursts may be denoted as a sub-frame.

In another embodiment of the present invention, additional information may be encoded into the servo patterns. Specifically, a single symbol of an M-ary alphabet may be encoded per servo frame. Therefore, for encoding a word containing x digits, x servo frames may be used. Within a servo frame, the symbol may be encoded redundantly in more than one servo burst, or may not be encoded redundantly on a servo burst basis such that only a single burst holds the encoded information. In the specific embodiment introduced above wherein the servo frame comprises four servo bursts, the symbol may be encoded only in two consecutive servo bursts, and preferably in the first two servo bursts. However, other encoding configurations within a servo frame may be possible. Within a servo burst, and provided that a servo burst holds a sub-pattern in form of a set of parallel stripes, only a subset of the set of stripes may be used for encoding a symbol. In one embodiment, a single stripe of the set of stripes may be used for encoding a symbol. In another embodiment, multiple stripes, e.g., two stripes out of the set of stripes of a burst may be encoded with a symbol, and preferably all these stripes may be encoded by the same symbol which is the single symbol encoded in the present servo frame. Encoding a symbol redundantly into multiple stripes and/or into multiple servo bursts and/or into multiple sub-frames further improves a reliable decoding of such symbol.

Specifically, the additional information may be information as to a presently scanned longitudinal position of the tape. Such longitudinal position information, also denoted as LPOS, may in one embodiment be encoded in the servo patterns. Hence, the longitudinal position of the tape may be identified based on the LPOS information read by the servo reader. The LPOS information may be used for winding the tape media to a given longitudinal position and, for example, starting reading and/or writing at such specified longitudinal position. Other information such as manufacturing information may be added too, which, for example, may indicate the manufacturer of the tape cartridge, the date of manufacturing the tape cartridge, information as to the standard the present cartridge may conform to, etc.

In the present embodiments, at least one of the stripes of the first burst has a first magnetic polarity and at least one of the stripes of the second pattern has a second magnetic polarity different from the first magnetic polarity. Hence, polarity modulation of servo stripes within two neighboring bursts of a servo frame is introduced. The proposed servo patterns and write schemes employ servo stripes having different magnetizations/polarities of at least one stripe in the first burst and at least one stripe in the second burst. Preferably, the different magnetizations/polarities used are opposite magnetizations/polarities.

Given that the magnetic tape medium contains magnetizable material, the above stripes are represented by a geometric area with a defined magnetization to produce a readback signal with specified polarity. The stripe magnetization preferably is distinguishable from the magnetization of the area surrounding the subject stripe in order to allow detecting the stripe. By inverting the magnetization of the stripe, a readback signal with opposite polarity can be obtained.

Prerecording the servo patterns onto the tape may preferably comprise two steps: First, a magnetic layer of the servo band or of the entire tape is AC erased, by this evoking a non-uniform, stochastic polarity of magnetic particles at least in the servo band. Then, the stripes may preferably be imprinted at two different polarities which polarities in any case can be distinguished from the stochastic polarity of the background. A servo write transducer(s) imprints these servo stripes/patterns into the magnetic tape medium. There may be different options in imprinting the servo stripes: In one embodiment the stripes are magnetized perpendicularly, i.e., into an orientation perpendicular to the longitudinal orientation, i.e., an orientation into or out of the tape. Preferably, the first burst then contains at least one stripe with a first polarity directed out of the plane of the tape, and at the second burst contains at least one stripe with a second polarity opposite to the first polarity, i.e., directed into the plane of the tape, or vice versa. In an alternative embodiment, the magnetic orientation of at least one stripe in the first burst is longitudinal, i.e., in parallel to the longitudinal extension of the tape, in a first direction, and at least one stripe of the second burst is magnetized longitudinal in the second direction opposite to the first direction.

In the figures, same or similar elements are denoted by the same reference signs.

FIG. 1 illustrates a schematic top view on a section of a tape according to an embodiment of the present invention. The tape 1 has a longitudinal extension in x direction and a lateral extension in y direction. Servo bands 11 and data bands 12 extend along the longitudinal extension of the tape 1. Each data band 12 is arranged in between two servo bands 11. Each data band 12 contains multiple data tracks wherein preferably multiple of these data tracks of a data band 12 are written and/or read simultaneously in case a tape head of the tape drive provides multiple write and/or read elements. Each servo band 11 contains servo patterns arranged along the longitudinal extension of the tape 1.

Figure 2:
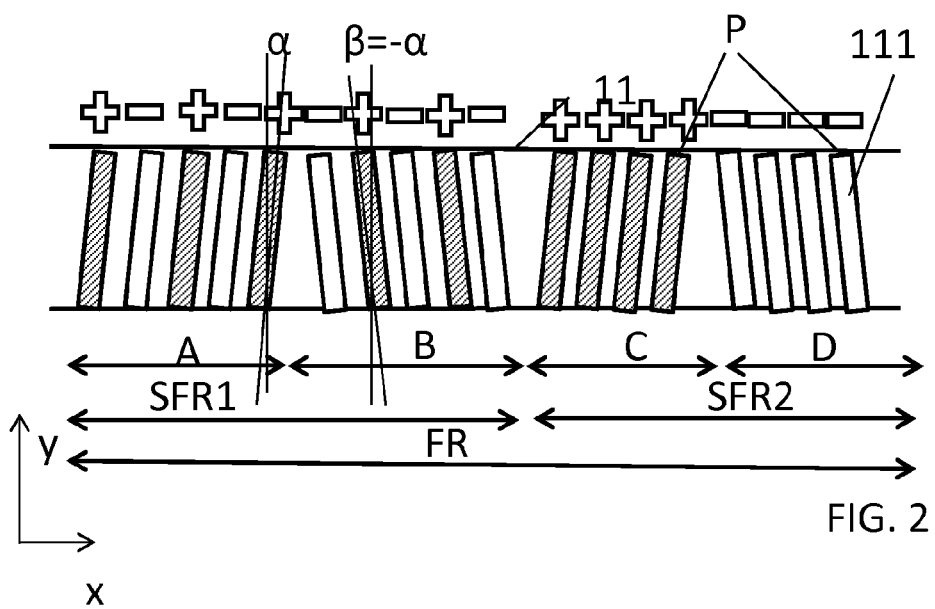

FIG. 2 illustrates a cutout of area Z of the tape 1 of FIG. 1. Hence, FIG. 2 provides an illustration of a sample servo pattern in a servo frame FR containing two servo sub-frames SFR1 and SFR2 according to an embodiment of the present invention. In the present example, the servo frame FR comprises eighteen servo stripes 111 organized in four bursts A, B, C and D of five or four stripes. Each stripe 111 is oriented at an azimuthal angle α or β with respect to the lateral extension of the tape 1 in y-direction, in the present example of either α=+6° or β=−α=−6°.

Generally, a servo frame may represent a longitudinal section of the servo band containing a defined core pattern, which core pattern, for example, is defined by the number of stripes, their orientation and their sequence. A sub-frame, in this example, may contain a sub-portion of the core pattern contained in the servo frame. A burst may contain a sub-portion of the core pattern contained in the servo frame or contained in a servo sub-frame if any. In the present context, a burst preferably contains consecutive stripes of the same orientation. In general, stripes of consecutive bursts within a sub-frame, residing at the same position, i.e., an n-th position, are denoted as a pair P of stripes as shown in FIG. 2. Stripes of different sub-frames preferably are not considered as pair of stripes. In case there are no sub-frames such as in the embodiment of FIG. 3, stripes of consecutive bursts within a frame residing at the same position, i.e., an n-th position, are denoted as a pair P of stripes.

While reading and/or writing data from and/or to the tape, the tape moves relative to a tape head in the longitudinal direction x. In addition, the tape head preferably is movable in the lateral direction y, i.e., transverse to the direction x, by means of a suitable actuator. However, due to a lateral offset of the tape with respect to the tape head, a misalignment of both may occur. For realigning the tape with the tape head, the position of the tape head relative to the tape is estimated from a relative timing of pulses (a.k.a. dibits) generated by a servo reader reading the servo stripes/patterns from the one or more servo bands during tape drive operation. In particular, a servo channel can estimate a tape velocity by measuring a time difference between pairs of stripes with identical azimuthal angle, e.g., between A- and C-burst stripes/pulses and B- and D-bursts stripes/pulses. By comparing the relative timing of pulses generated by pairs of stripes with opposite azimuthal angles, e.g., between A- and B-burst stripes and C- and D-bursts stripes, combined with the above mentioned velocity estimate, the servo channel can further estimate the lateral position of the tape head. In case that a deviation between the tape head and the tape is determined, a control unit may, in a closed-loop control, control the actuator of the tape head and laterally reposition the tape head such that the tape head is laterally realigned with the tape.

Generally, additional information may be encoded in the servo frames of the servo band. For example, such additional information may be encoded into code words of length g by using an M-ary alphabet of symbols with M>1. Given that a number of g symbols contribute to the code word, in one embodiment g servo frames may be used for representing a code word wherein each servo frame contains a symbol of such code word. Specifically, the alphabet A may be a binary alphabet with symbols "0" and "1". In each consecutive servo frame a single symbol may be encoded, i.e., either a "0" or a "1". However, a sequence of symbols may also be encoded in consecutive servo frames with added redundancy to allow for error correction.

In the embodiment of FIG. 2, additional information is encoded in the servo frame FR. The additional information is encoded by polarity modulation. In the present example, each pair of stripes in the first and second burst A and B as well as in the third and fourth bursts C and D show an opposite polarity indicated by the plus and minus signs in the circles above the stripes 111. In the present example, the additional information is encoded in the second pair of stripes of the first and second burst A and B, and redundantly in the fourth pair of stripes of the first and second burst A and B. In FIG. 2, the −/+ polarity in the second and fourth pairs of stripes may, for example each represent symbol "1" while symbol "0" would have been represented by the opposite polarity +/− in each of the second and the fourth pair of stripes.

In FIG. 2, the polarities of all pairs of stripes except for the second and fourth pair of stripes in the first and second burst A and B are predefined and not alterable according to the encoding convention. Such non alterable pairs of stripes in the servo frame may be used for synchronization purposes and for an estimate of the lateral position of the tape head versus the tape.

It is noted that generally any pair of stripes of a servo frame may be used for encoding additional information and any redundancy schemes or any schemes for encoding more than one symbol per servo frame may be applied.

Figure 3:
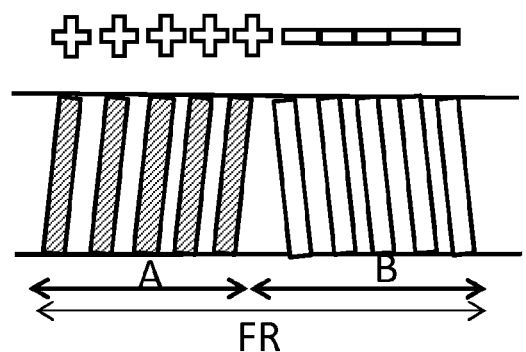
Figure 4:
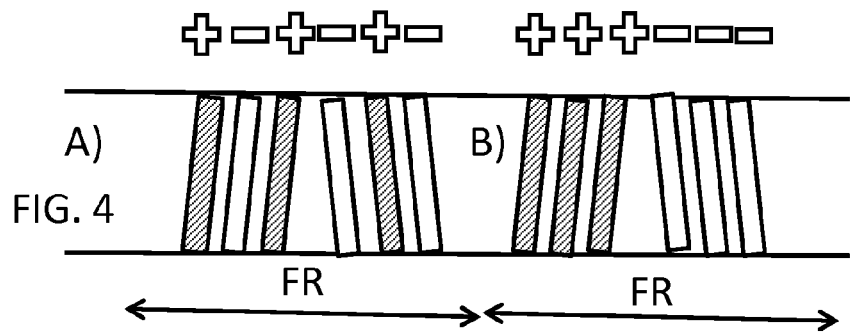
Figure 5:
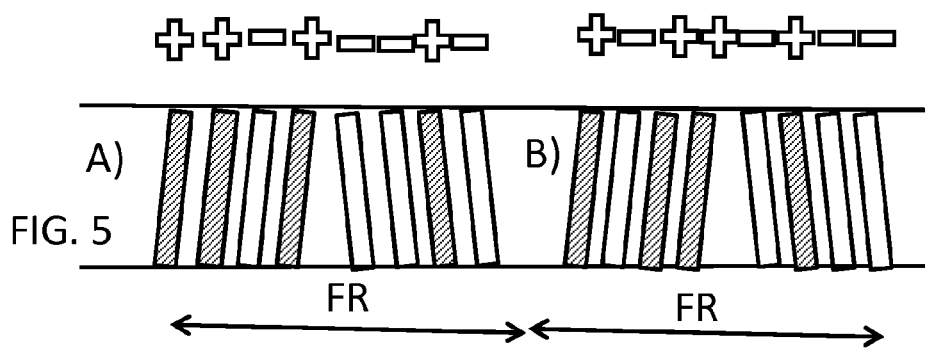

FIGS. 3 to 7 each illustrates a top view on the geometry of a servo pattern in a servo frame FR according to different embodiments of the present invention. What is common to all embodiments of FIGS. 3 to 5 is that all pairs of stripes in the first and second burst A and B, and all pairs of stripes in the third and fourth burst C and D if applicable contain stripes of different, and in particular of opposite polarity.

In the embodiment of FIG. 3, the servo frame FR comprises only two bursts A and B with each burst A and B containing five stripes, wherein all stripes of the first burst A are magnetized into a positive polarity while all stripes of the burst B are magnetized into negative polarity. In another variant, one or more pairs of stripes may be used for encoding additional information.

In the embodiment of FIG. 4, a servo frame FR is shown in diagram a) with a bit value b=0 being encoded, while in diagram b) the same frame FR is shown with a bit value b=1 being encoded. Again, the frame FR includes a first burst A and a second burst B. Each burst A and B contains three stripes. Again, all pairs of stripes in the A- and B-burst have opposite polarity. While the first and third stripe of the A and B burst have non alternating polarity across all servo frames, the second stripe is polarity modulated to encode one bit of information per frame FR.

FIG. 5 shows another embodiment of a servo pattern wherein all pairs of stripes in frame FR have opposite polarity. In diagram a), a servo frame FR is shown with a bit value b=0 being encoded, while in diagram b) the same frame FR is shown with a bit value b=1 being encoded. While the first and fourth pairs of stripes in each FR have a fixed, non-alternating polarity, the second and third pairs of stripes in each frame FR are polarity modulated for encoding one bit of information per frame FR. Note that compared to FIG. 4, the FIG. 5 scheme exhibits additional features: A symbol of the binary alphabet is encoded in each frame by two pairs of stripes not showing the same polarities amongst these two pairs but showing different polarities. In this way, a variation of a readback signal energy due to potential inter-dibit signal interference as a function of the encoded information can be mitigated. Note that, assuming the longitudinal direction of the tape movement is known, the schemes according to FIGS. 3 to 5 allow for a servo sub-frame boundary detection. Therefore, it is possible to construct servo frames comprising a single sub-frame.

FIG. 6 shows an embodiment with a frame FR containing two sub-frames SFR1 and SFR2, wherein a pair of stripes may be allowed to contain stripes of the same polarity. For example, pairs of stripes in the A and B burst may be written at the same polarity, and pairs of stripes in the C and D burst may be written at the same polarity.

In this example, pairs at the same position in different sub-frames may contain opposite polarities such that the sub-frame SFR1 may be distinguishable within the servo frame FR by means of the opposite polarities of the first and fourth pairs of stripes with respect to the polarities of stripes of the first and fourth pairs of stripes in the sub-frame SFR2.

In this embodiment, overall two bits of information may be encoded per frame FR, i.e., one bit is encoded in sub-frames SFR1, SFR2 each. For encoding a symbol, the second and third pair of stripes in the A and B burst is reserved, and for encoding a second symbol, the second and third pair of stripes in the C and D burst is reserved. For doing so, the polarities of the second and third pair of stripes are modulated to opposite polarities.

Figure 6A:
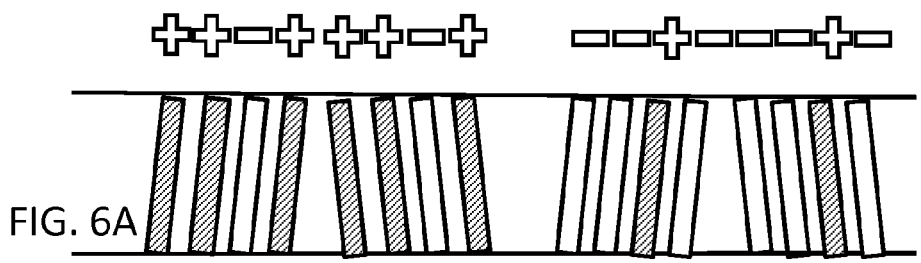
Figure 6B:
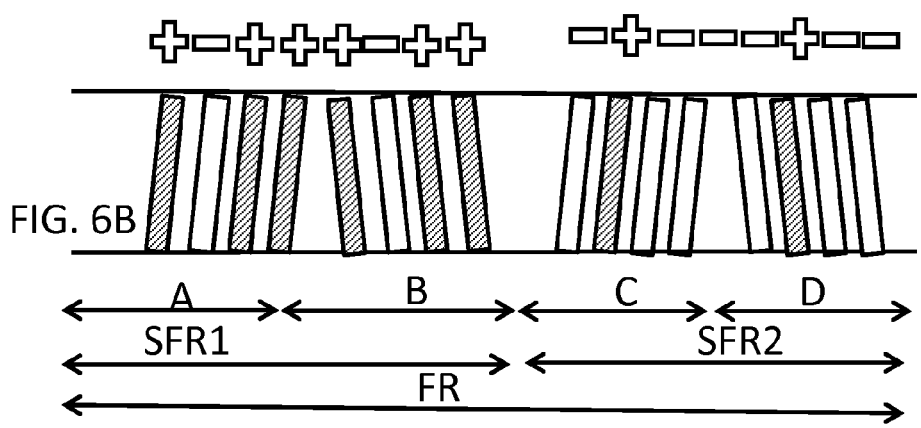

While in FIG. 6A) the second and third pair of stripes in the sub-frame SFR1, for example, represent the symbol '1', while the second and third pair of stripes in the sub-frame SFR2 represent the symbol '0', in FIG. 6B) the second and third pair of stripes in the sub-frame SFR1 represent the symbol '0', while the second and third pair of stripes in the sub-frame SFR2 represent symbol '1'.

Figure 7:
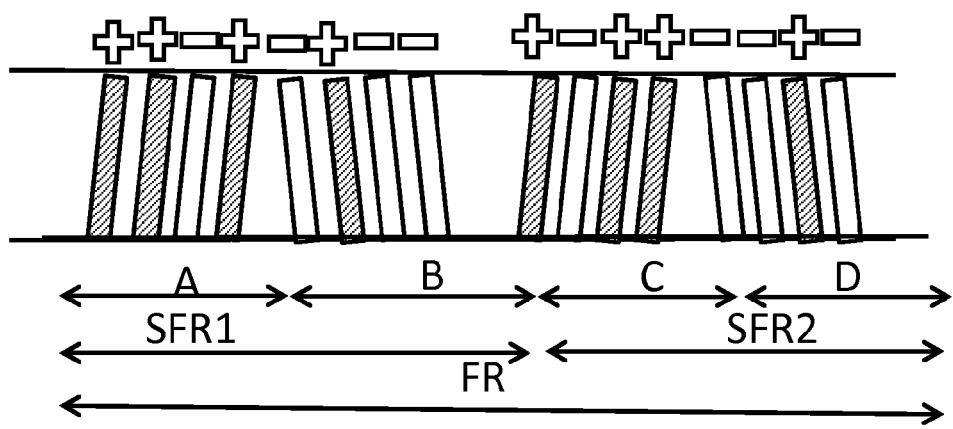

FIG. 7 shows a case where at least some pairs of stripes in the A and B burst have no fixed polarity relation: The first and fourth pairs of stripes in both sub-frames SFR1 and SFR2 have opposite polarity for sub-frame boundary detection, while the second and third pairs of stripes in each sub-frame SFR1 and SFR2 have the same polarity but are modulated to encode one bit of information per sub-frame.

Figure 8:
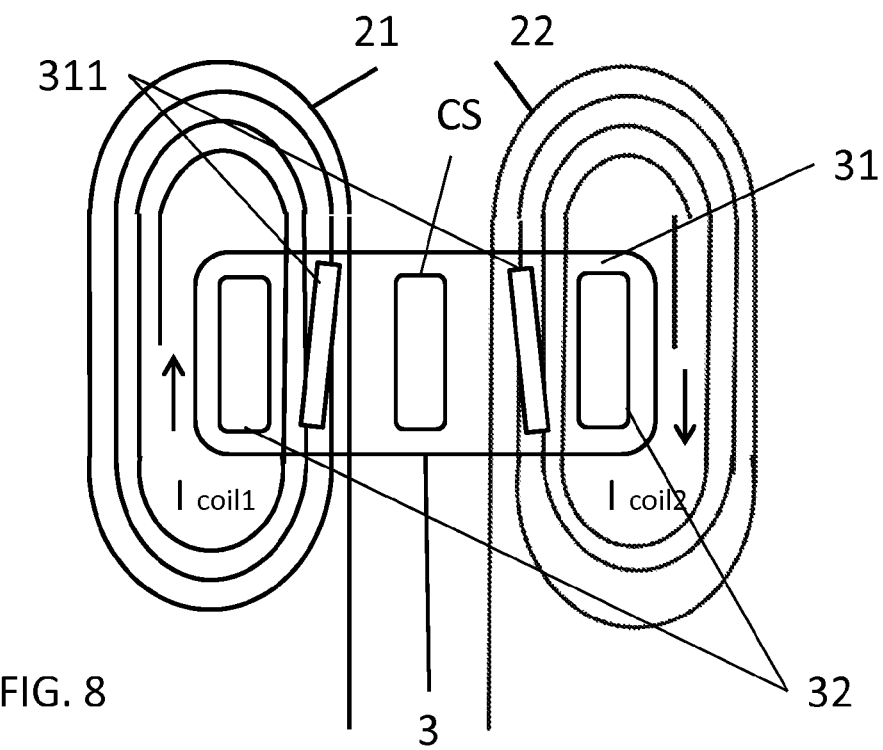

FIG. 8 illustrates a view on top of a servo write head for writing a servo pattern to a magnetic tape medium according to an exemplary embodiment. The write head contains two coils 21 and 22, wherein each coil 21, 22 generates a magnetic field when an electric current $I_{coil1}$, $I_{coil2}$ is applied to the subject coil 21, 22. A pole piece structure 3 is provided for guiding the generated magnetic flux, a top pole 31 of which pole piece structure 3 is visible in FIG. 8. The pole piece structure 3 comprises next to the top pole 31 a first ring structure including a yoke 32 around which the first coil 21 is would, and a second ring structure including a yoke 32 around which the second coil 22 is wound. The first ring structure and the second ring structure comprise a common section CS between the first coil 21 and the second coil 22. The yokes 32 and the common section CS each are oriented in/out the plane of projection. Each ring structure contains a gap 311. The gaps presently are arranged in the top plate 31 of the pole piece structure 3. When applying current pulses $I_{coil1}$, $I_{coil2}$ with the same polarity to the coils 21 and 22 as shown in FIG. 8, the magnetic fields generated across the two gaps 311 are oriented in opposite directions. In the present embodiment, the two gaps 311, and the underlying sections of the rings structure are oriented in a common plane which is the plane of the planar top pole 31. The two gaps 311 serve as write gaps and take the shape of the stripes to be imprinted on the tape. The tape typically is guided across the top pole 31, i.e., in parallel to the plane of projection, with the servo band to be written passing across the top pole 31 with its gaps 311. Preferably, when the position along the tape where it is desired to write a pair of servo stripes is reached, current pulses $I_{coil1}$ and $I_{coil2}$ may be applied to the coils 21 and 22 for imprinting stripes of different, and especially opposite polarities to the servo band. The desired polarity depends on the direction of current applied to the subject coil. Preferably, the current pulses may be applied simultaneously to the coils 21 and 22. During and after writing such pair of stripes, the tape continues to move forward. After some time the gaps 311 are aligned with a new position of the tape. In this new position another pair of stripes may be imprinted. Hence, an example of a write head is introduced with two write gaps being driven by two independently controllable pancake coils which can be fabricated using thin film technology.

Note that the servo pattern of FIG. 7 preferably is written by a write head according to FIG. 8 with two independent coils given that a pair of stripes in the scheme of FIG. 7 may have stripes of the same polarity. Of course, all other patterns according to FIGS. 2 to 6 may be written by the write head according to FIG. 8, too.

Figure 9:
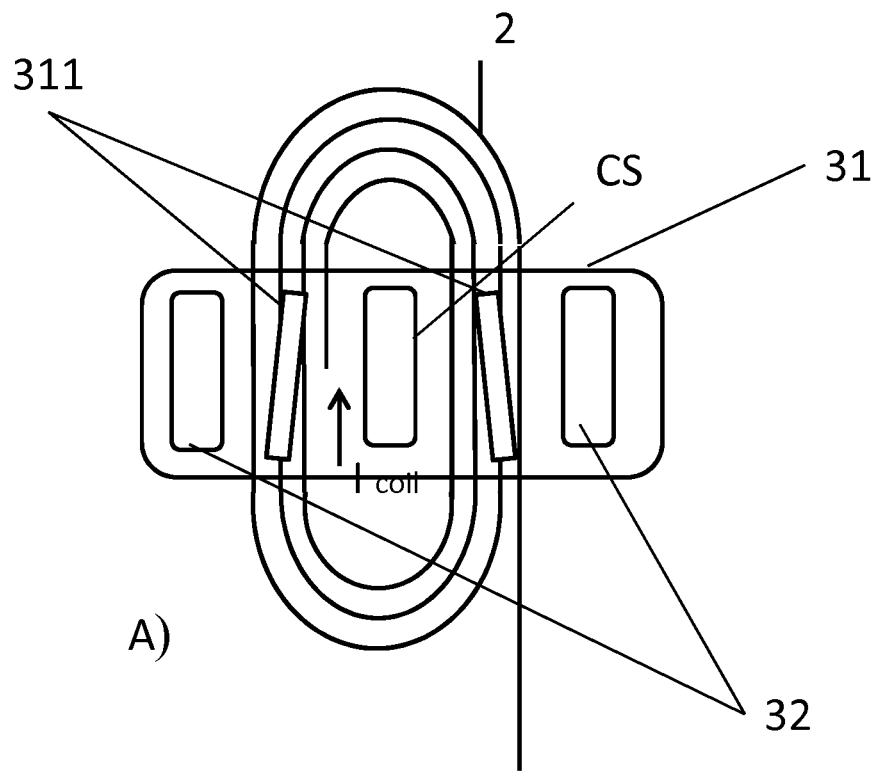
Figure 9:
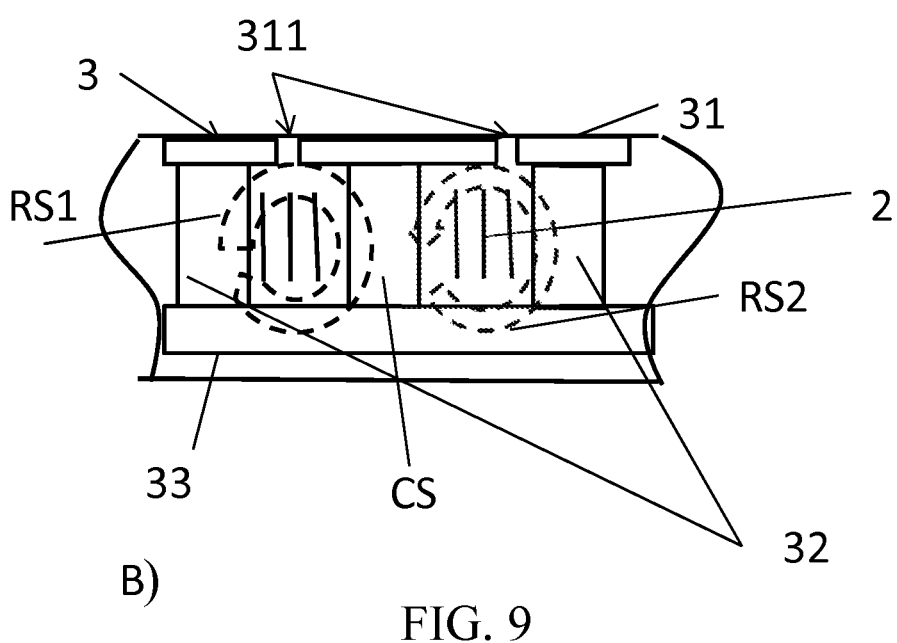

FIG. 9 illustrates another write head according to an embodiment of the present invention, now containing a single coil 2. Diagram 9A) illustrates a top view, and diagram 9B) a side cut. The coil 2 is wound around a common section CS of a pole piece structure 3. The pole piece structure 3 generally contains two ring structures RS1 and RS2 which are indicated in diagram 9B by dashed circles, and which share the common section CS around which the coil 2 is wound. Other than that, the first ring structure RS1 contains yoke 32, and the second ring structure RS2 contains another yoke 32. A top pole 31 and a bottom pole 33 complete the ring structures RS1 and RS2 wherein the top pole 31 has two write gaps 311 for writing the stripes to the tape.

Given that there only is a single coil 2 provided in the embodiment of FIG. 9, both stripes are written by applying one current pulse $I_{coil}$ to the coil 2. The magnetic field generated by applying this current pulse $I_{coil}$ has opposite directions in the two gaps 311 by that writing stripes of opposite polarity to the tape. The polarity of each stripe may be changed when applying a current pulse $I_{coil}$ of a different sign to the coil 2, however, still both stripes will be written at opposite polarity.

Note that the servo patterns of FIG. 6 and FIG. 7 cannot be written by the write head of FIG. 9 given that the pattern contains pairs of stripes with the same polarity while the write head of FIG. 9 is adapted to write a pair of stripes with different polarity only. However, the patterns of FIG. 2 to FIG. 5 may be written by the write head of FIG. 9.

In both embodiments of servo write heads as introduced above, gapped magnetic write poles are provided, wherein the gaps are shaped to achieve a desired imprint into the tape media via fringing fields. In such tape heads, two stripes of different geometric orientation may be imprinted at a time. The write poles are driven by the provision of magnetic yokes, poles and coils. A servo write head may be assembled from separately fabricated parts, or may be built up from a planar substrate using thin-film microfabrication techniques. The latter presents advantages in volume fabrication and in decreased inductance and current requirement, which enables writing more abrupt servo patterns and/or formatting tape at a greater speed.

The embodiments of write heads lead to a servo writing of sub-patterns such as stripes located at different positions along the direction of motion of tape, e.g., the n-th stripe of the A- and B-bursts, are written simultaneously, so that their imprints in the tape are located at a fixed and accurate distance from each other independently of tape velocity jitter.

In general, a polarity modulation applied within a servo pattern of a servo frame eliminates a linear density penalty and allows stripes of different orientation to be distinguished even without frame boundary detection and/or allows for encoding additional information. Servo stripes are no longer limited represented by magnetic imprints with identical magnetization/polarity footprint. In case additional information is desired to be encoded, the polarity may be used for encoding purposes, too, which does not require additional footprint on the tape. Inter-dibit interference may be limited and high linear density can be achieved. High linear densities are desired for both good position error signal (PES) resolution and fast update rates/short frame length. A shape of the readback signal (dibit) is identical for all stripes. This so that the servo channel only needs to implement one dibit matched filter for maximum-likelihood (ML) detection, but requires accurate servo (sub-)frame synchronization (frame boundary detection) in order to distinguish between stripes/bursts of different azimuthal angles. In the case of the LTO format, the servo channel has to first find the (sub-)frame boundaries by identifying the A, B burst structure of the first sub-frame followed by the C, D burst structure of second sub-frame. Once these boundaries have been detected, velocity and y-position can be estimated by the servo channel.

However, it will be understood by those skilled in the art that many modifications and permutations may be made without departing from the scope of the present invention. For example, generalizations with different number of stripes and/or additional encoded bits per sub-frame are easily possible. Polarity modulation/encoding can be used to distinguish between servo stripes/bursts of different azimuthal angles. The dibit readback pulse of the stripes/bursts with a first azimuthal angle will show opposite polarity, e.g., at +90° and at −90°, when compared to the dibit pulse of the stripes/bursts with a second azimuthal angle.

The servo patterns heretofore discussed may be written to an AC erased media.

As will be appreciated by one skilled in the art, aspects of the present invention may be embodied as a tape medium, a write head, a method or a computer program product. Accordingly, aspects of the present invention, in particular in form of the controller, may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention, such as the write methods, may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

According to one aspect of the invention, a magnetic tape medium is provided comprising at least one servo band along a longitudinal extension of the tape medium which at least one servo band comprises servo patterns organized in servo frames for supporting to determine positional information. At least one of the servo frames comprises a first burst comprising at least two servo stripes inclined at a first angle with respect to a direction orthogonal to the longitudinal extension of the tape medium, followed by a second burst comprising at least two servo stripes inclined at a second angle with respect to the direction orthogonal to the longitudinal extension of the tape medium, which second angle is different from the first angle. At least one of the stripes of the first burst has a first magnetic polarity and at least one of the stripes of the second burst has a second magnetic polarity different from the first magnetic polarity.

In embodiments, the magnetic tape medium may comprise one or more of the following features: the first burst is immediately followed by the second burst in a longitudinal direction of the tape medium such that a last stripe of the first burst is followed by a first stripe of the second burst; the first magnetic polarity is a polarity oriented opposite to the second magnetic polarity; all servo stripes of the first burst have the first magnetic polarity, and all servo stripes of the second burst have the second magnetic polarity; a number of servo stripes in the first burst is equal to a number of servo stripes in the second burst; two stripes residing at a same position in the first burst and the second burst are collectively denoted as a pair of stripes; each pair of stripes in the first burst and the second burst contains stripes of the first magnetic polarity and the second magnetic polarity; at least one pair of stripes contains one stripe having the first polarity and one stripe having the second polarity; each pair of stripes in the first and second burst contain one stripe having the first polarity and one stripe having the second polarity; at least one pair of stripes at a defined position in the servo frame contains a predefined magnetic polarity in its stripes representing a synchronization pattern; the at least one servo band comprises a set of servo frames, wherein each servo frame of the set of servo frames comprises at least a first burst and a second burst, wherein each servo frame of the set of servo frames contains the predefined magnetic polarity in the at least one pair of stripes representing the synchronization pattern; at least one pair of stripes at a defined position in the servo frame contains a magnetic polarity in its stripes representing encoded information; the encoded information contains one or more of: a servo band identifier, longitudinal direction position; the at least one servo band comprises a set of servo frames, wherein each servo frame of the set of servo frames comprises a first burst and a second burst, wherein each servo frame of the set of servo frames contains at least one pair of stripes with a magnetic polarity in its stripes representing encoded information; the stripes of the at least one pair of stripes representing encoded information have a different magnetic polarity irrespective of the information encoded.

According to another aspect of the present invention, a write head for writing a servo pattern to a magnetic tape medium comprises a coil for generating a magnetic flux when applying an electric current to the coil, and a pole piece structure for guiding the generated magnetic flux. The pole piece structure comprises a first ring structure for guiding a first portion of the generated magnetic flux, a second ring structure for guiding a second portion of the generated magnetic flux, and a common section of the first and the second ring structure around which common section the coil is wound. A section containing a gap is provided in each of the first ring structure and the second ring structure, wherein the magnetic flux is oriented in opposite directions across the gaps, and preferably wherein the sections containing the gap each are oriented in a common plane.

A method is provided for writing a servo pattern to a magnetic tape medium by means of a tape head previously introduced in which method the magnetic tape medium is moved with its servo band above the two gaps in a direction along the longitudinal extension of the magnetic tape medium. A current pulse is applied to the coil. The magnetic tape medium is continued to move, and another current pulse is applied to the coil.

In an exemplary embodiment, the magnetic tape medium is continuously moved at a constant velocity during writing the servo pattern, and the other current pulse is applied after the current pulse is applied.

According to a further aspect of the present invention, a write head for writing a servo pattern to a magnetic tape medium comprises a first coil for generating a first magnetic field when applying an electric current to the first coil, a second coil for generating a second magnetic field when applying an electric current to the second coil, and a pole piece structure for guiding the generated magnetic fields. The pole piece structure comprises a first ring structure for guiding the first magnetic field, a second ring structure for guiding the second magnetic field, and a common section of the first and the second ring structure which common section is arranged between the first coil and the second coil. A section containing a gap is comprised in each of the first ring structure and the second ring structure, wherein the magnetic field is oriented in opposite directions across the gaps, and preferably wherein the sections containing the gap each are oriented in parallel to a common plane.

In a method for writing a servo pattern to a magnetic tape medium by means of a tape head according to the previous embodiment, the magnetic tape medium is moved with its servo band above the two gaps in a direction along the longitudinal extension of the magnetic tape medium. A first current pulse is applied to the first coil and a first current pulse is applied to the second coil. The magnetic tape medium is continued to move, and a second current pulse is applied to the first coil and a second current pulse is applied to the second coil.

In an exemplary embodiment, the magnetic tape medium is continuously moved at a constant velocity during writing the servo pattern, and the first current pulses are applied simultaneously and the second current pulses are applied simultaneously after the first current pulses were applied.

According to another aspect of the present invention, a computer program medium is provided containing computer program code means for implementing a method according to any one of the previous embodiments when executed on a processor unit.

It is understood that method steps may be executed in a different order than listed in a method claim. Such different order shall also be included in the scope of such claim as is the order of steps as presently listed.

Embodiments described in relation to the aspect of an apparatus shall also be considered as embodiments disclosed in connection with any of the other categories such as the method, the computer program product, etc.

The invention claimed is:

1. A magnetic tape medium and write head for writing at least one servo pattern on the magnetic tape medium comprising:
   a first coil configured to generate a first magnetic flux when applying an electric current to the first coil;
   a second coil configured to generate a second magnetic flux when applying an electric current to the second coil;
   a pole piece structure configured to guide the generated magnetic flux, comprising a first ring structure for guiding the first magnetic flux, a second ring structure for guiding the second magnetic flux, and a common section of the first and the second ring structure, which common section is arranged between the first coil and the second coil; and
   a section containing a gap in each of the first ring structure and the second ring structure, wherein the magnetic flux is oriented in opposite directions across the two gaps, and wherein the sections containing the gaps are oriented in a common plane;
   wherein the magnetic tape medium comprises:
      at least one servo band along a longitudinal extension of the tape medium, the at least one servo band comprising servo patterns organized in servo frames for supporting to determine positional information;
      at least one of the servo frames comprising a first burst comprising at least two servo stripes inclined at a first angle with respect to a direction orthogonal to the longitudinal extension of the tape medium, followed by a second burst comprising at least two servo stripes inclined at a second angle with respect to the direction orthogonal to the longitudinal extension of the tape medium, which second angle is different from the first angle; and
      wherein at least one of the stripes of the first burst has a first magnetic polarity, and wherein at least one of the stripes of the second burst has a second magnetic polarity different from the first magnetic polarity; and
   for at least one of the first and second bursts, different stripes within a same burst have opposite magnetic polarities with respect to one another.

2. The magnetic tape medium and write head of claim 1, wherein the first burst is immediately followed by the second burst in a longitudinal direction of the tape medium such that a last stripe of the first burst is followed by a first stripe of the second burst.

3. The magnetic tape medium and write head of claim 1, wherein:
   a number of servo stripes in the first burst is equal to a number of servo stripes in the second burst;
   two stripes residing at a same position in the first burst and the second burst are collectively denoted as a pair of stripes; and
   each pair of stripes in the first burst and the second burst contains stripes of one of the first magnetic polarity and the second magnetic polarity.

4. The magnetic tape medium and write head of claim 3, wherein:
   at least one pair of stripes contains one stripe having the first polarity and one stripe having the second polarity; and
   each pair of stripes in the first and the second burst contain one stripe having the first polarity and one stripe having the second polarity.

5. The magnetic tape medium and write head of claim 3, wherein at least one pair of stripes at a defined position in the servo frame contains predefined magnetic polarity in its stripes representing a synchronization pattern.

6. The magnetic tape medium and write head of claim 5, wherein:
   the at least one servo band comprises a set of servo frames;
   each servo frame of the set of servo frames comprises a first burst and a second burst; and
   each servo frame of the set of servo frames contains the predefined magnetic polarity in the at least one pair of stripes representing the synchronization pattern.

7. The magnetic tape medium and write head of claim 3, wherein:
   at least one pair of stripes at a defined position in the servo frame contains magnetic polarity of its stripes representing encoded information; and
   the encoded information contains one or more of a servo band identifier and a longitudinal direction position.

8. The magnetic tape medium and write head of claim 7, wherein:
   the at least one servo band comprises a set of servo frames;
   each servo frame of the set of servo frames comprises a first burst and a second burst;
   each servo frame of the set of servo frames contains at least one pair of stripes containing magnetic polarities in its stripes representing the encoded information; and
   the stripes of the at least one pair of stripes representing encoded information have a different magnetic polarity irrespective of the information encoded.

* * * * *